March 22, 1949. W. A. ANDERSON 2,465,185
DISTRIBUTOR PHASE CORRECTOR CIRCUIT
Filed Nov. 30, 1945
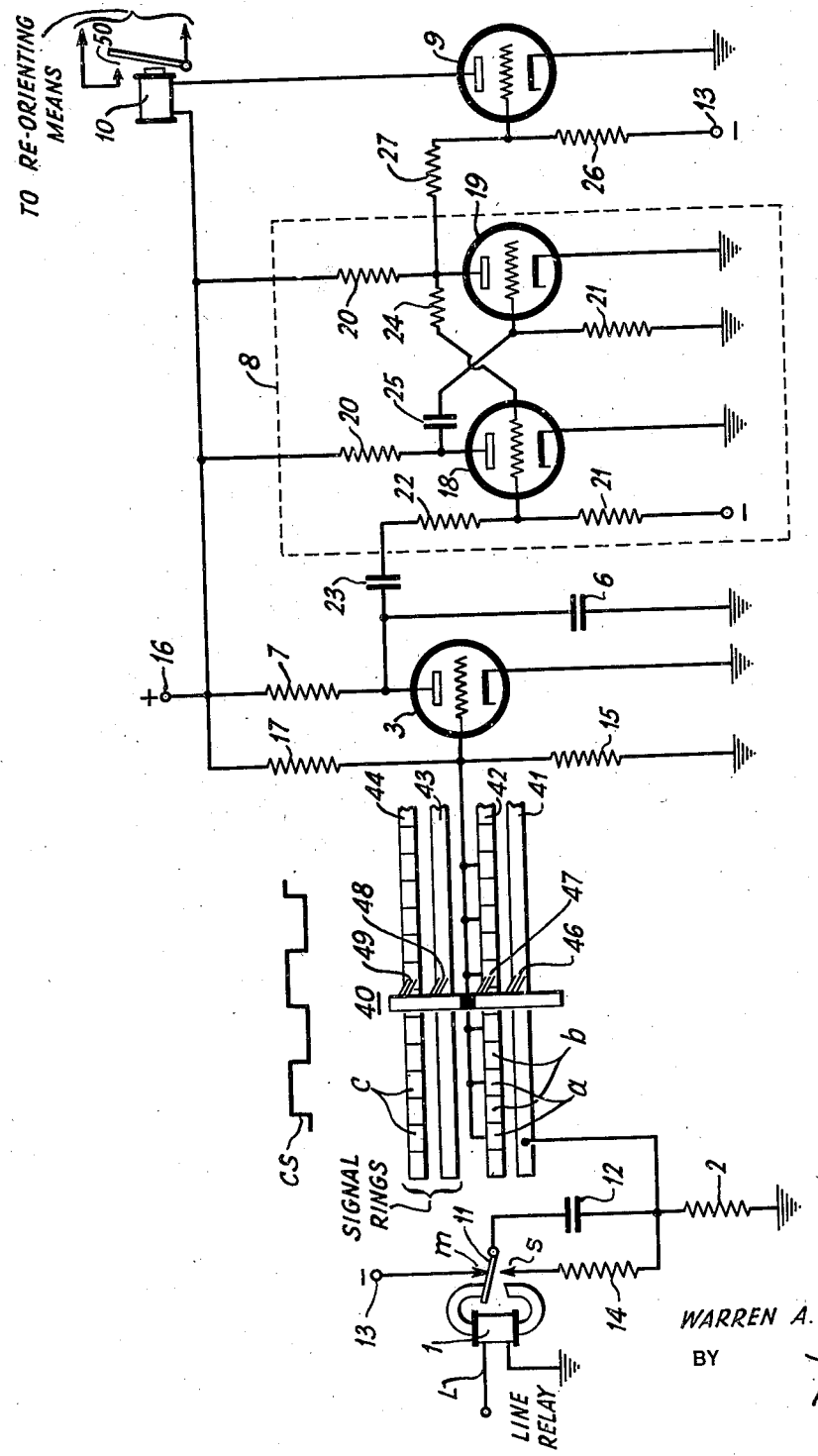
INVENTOR
WARREN A. ANDERSON
BY
ATTORNEY Patented Mar. 22, 1949

2,465,185

UNITED STATES PATENT OFFICE 2,465,185

DISTRIBUTOR PHASE CORRECTOR CIRCUIT

Warren A. Anderson, West Brighton, Staten Island, N. Y., assignor to Radio Corporation of America, a corporation of Delaware Application November 30, 1945, Serial No. 632,041

7 Claims. (Cl. 178—53)

This invention relates to a phase corrector such as may be employed, for example, in maintaining synchronism between two rotating members, at the transmitter and receiver respectively, in a synchronous telegraph system. The rotating members may be distributor brushes, or cams for cyclic circuit closing operations, or rotatable reactors such as disclosed in U. S. Patent 2,275,974 which issued March 10, 1942 to Richard E. Mathes. Other uses, however, will suggest themselves to those skilled in the art.

In multiplex telegraph and analogous systems, it is necessary to correct the speed or phase of the distributor or other periodic device in order to correctly translate the code elements of an incoming train of telegraph signals. There are numerous known systems of phase or speed correction, some of which operate, as in the instant case, to accelerate or retard the shaft of a driving motor and the rotating member coupled thereto whenever the angular displacement of a rotor requires restoration to proper phase. I have found, however, that the phase corrector circuit arrangement of my invention overcomes an inherent disadvantage of hitherto known systems in that a tendency to produce over-correction is avoided.

It is an object of my invention to provide means of extremely simple construction for correcting phase differences between two rotating members usually located at stations remote from each other, where phase correction is accomplished by referring the local control of one rotating member to the received intelligence signal elements.

Another object of my invention is to provide accurate phase correction of a receiving distributor brush or other rotatable member with respect to the incoming periodicity of incoming signals in such manner as to avoid over-correction in the event of signal distortion.

Other objects and advantages of my invention will be made apparent in the detailed description to follow. This description is accompanied by a drawing the sole figure of which shows diagrammatically a preferred embodiment of the invention.

Referring to the drawing, the incoming signals transmitted from a distant point arrive over a line L and pass through the coil of relay 1 to ground. It may be considered, for example, that the signals are of the plus-and-minus type and accordingly relay 1 is a polar relay, though, of course, it may be a simple relay where on-and-off signals are used.

The tongue 11 of relay 1 is connected through a capacitor 12 and a resistor 2 to ground. When the tongue 11 rests upon the marking contact m the capacitor receives a negative charge from a direct current source the negative terminal of which is indicated at 13, and the positive terminal of which will be understood to be grounded. When the tongue 11 rests upon its spacing contact s the capacitor 12 is discharged through a resistor 14.

The distributor 40, whose brushes are to be phase-corrected, is indicated in developed form. This distributor comprises conventionally a slip ring 41, a segmented ring 42, and these two rings being swept by one pair of interconnected brushes 46 and 47. The distributor also includes a slip ring 43 and a segmented ring 44 which are swept over by a pair of interconnected brushes 48 and 49 respectively. The segments of ring 44 are used for translation of the incoming signals by conventional receiving telegraph instrumentalities.

The junction between one terminal of condenser 12 and interconnected terminals of the resistors 14 and 2 is connected to the slip ring 41 for purposes of actuating the phase correcting system of my invention. Alternate segments a in the ring 42 are interconnected and are also connected to the control grid in a gating tube 3 which may be of the triode type if desired. Segments b which intervene between segments a may, to all intents and purposes, be regarded as insulation segments. The segments a are in radial alignment with active segments c in the signal ring 44. Segments a and c each extend over an arc sufficient to pick-up approximately half of a signal of dot unit length.

The control grid in tube 3 is connected to ground through a resistor 15 and is also connected through a resistor 17 to the positive terminal of a direct current source as indicated by the + sign at 16, this source having its negative terminal grounded. The anode in tube 3 is connected to the positive terminal of source 16 through a resistor 7. The cathode of the same tube is grounded, as is the negative terminal of source 16.

A capacitor 6, together with resistor 7, form a time constant circuit connected across the terminals of the source 16. Capacitor 6 is thus arranged to be charged when tube 3 is non-conductive and to be discharged when tube 3 becomes conductive. The purpose of this time constant will be explained hereinafter.

A conventional flip-flop circuit 8 is shown having two triode discharge devices 18 and 19 and associated circuit parameters including anode resistors 20, grid resistors 21, and a control circuit for tube 18 which includes a resistor 22 in series with a coupling capacitor 23 across which pulses are fed to tube 18 from the junction between resistor 7 and capacitor 6. The flip-flop circuit is also provided with cross-coupling connections between the anode of each tube and the grid of the other tube, one of these cross-connections being through a resistor 24 while the other includes a coupling capacitor 25.

The flip-flop circuit has a stable state in which tube 18 is normally non-conducting and tube 19 is normally conducting. In the active or tripped (sometimes called the unstable) state, resulting from a tripping pulse, the tube 18 is conducting and the tube 19 is non-conducting. After a period of time in the active state, depending upon the time constants of the flip-flop circuit, this circuit will restore itself to the stable state.

A utilization circuit is connected to the output side of the flip-flop circuit arrangement 8 and includes a relay tube 9 whose cathode is grounded, whose grid is normally negatively biased by a connection through resistor 26 to the negative source 13, and whose anode is connected to the positive terminal of source 16 through the winding of a magnet 10 which controls the mechanism of the phase corrector. The anode of tube 19 and the grid of tube 9 are coupled together through a resistor 27 of relatively high ohmic value.

In the operation of my improved phase corrector circuit arrangement negative pulses produced across resistor 2 at the start of each mark signal are coupled to the grid of the gating tube 3 through the correction segments a of the distributor ring 42. The duration of the pulse coupled to the grid of triode 3 is dependent on the phase of the brush 47 at the start of mark with respect to the segments.

It will be noted that a positive bias is normally applied to the grid of tube 3 so that this tube stands in a conductive state except when a negative pulse is applied through the distributor. This negative pulse operates to bias the tube 3 to cut-off. During the non-conductive state of tube 3 condenser 6 charges through resistor 7 from the plus voltage of the source 16. The product of ohmic value of resistor 7 and the capacitive value of condenser 6 is made sufficiently large so that the voltage to which condenser 6 can charge (in the maximum time available) is directly proportional to time. When the pulse from the distributor ends triode 3 again becomes conductive and discharges the condenser 6 with the result that a saw-tooth wave is developed across capacitor 23 for controlling the flip-flop circuit 8.

The coupling impedance between the anode of tube 3 and the grid of tube 18 is suitably chosen to avoid unbalancing of the circuit parameters in the flip-flop circuit. The flip-flop circuit as a whole behaves like a quick-acting, slow release relay and times the length of the pulses which pass through the amplifier tube 9 and through the corrector actuator magnet 10. However, the saw-tooth wave peak applied to the grid of tube 18 must be of a predetermined minimum amplitude, as provided by the charge on condenser 6 in order to trigger the tube into the active state. Thus a predetermined minimum phase departure is essential for starting of the flip-flop action.

Since the flip-flop circuit 8 becomes insensitive to external control until tube 18 is again blocked, the release time of this circuit will be adjusted to avoid overcompensation in the phase correction function. This is accomplished by a choice of values of the components 21 and 25 so as to limit the number of correction impulses which may be applied during any given period.

I have not shown the means for applying the effects of operating the release magnet 10 for re-orientation of the distributor brushes since it will be well understood by those skilled in the art that conventional means may be employed. For example, if the distributor motor speed at the receiving station is adjusted for a normal gain over the speed of the distributor motor speed at the transmitting station, then phase correction is conventionally obtained by any suitable stepwise-operated mechanism to reorient the receiver brushes backward independently of the driving motor whenever the magnet 10 is energized. If the receiving distributor speed normally produces a lag in its phase, then the phase corrector can be arranged to re-orient the brushes in a forward direction.

As shown in Patent 2,038,375, granted April 21, 1936 to R. E. Mathes, the phase corrector mechanism may take the form of an auxiliary motor geared to an orientable stator housing for the distributor driving motor. In such a case my actuator magnet 10 would possess contacts 50 for closing a circuit through the windings of the auxiliary corrector motor. Other mechanisms for reorientation of the brushes or equivalent rotatable members are also known in the art.

Various modifications of my invention may be made without departing from its spirit and scope. The embodiment shown is merely illustrative.

I claim:

1. A device for use in correcting the phase of a rotatable member to maintain it in synchronism with the periodicity of an incoming train of code signals, comprising a circuit arrangement for producing a pulse which corresponds with the start-of-mark in said signals, a flip-flop circuit including two discharge tubes each subject to control through its input circuit and each having its input circuit coupled to the output circuit of the other for producing mutual interaction, means operative under normal conditions to hold the first of said tubes non-conductive and the second of said tubes conductive, means dependent upon departures of said rotatable member from proper phase relation to said signals for producing and feeding a saw-tooth wave to the input circuit of the first tube, thereby to unblock the same, and time constant elements included as components of said flip-flop circuit, said elements constituting means for rendering said flip-flop circuit insensitive to further control by said saw-tooth wave during a predetermined time interval.

2. In a synchronizing system, a continuously rotatable member the phase of which is to be corrected relative to the cadence of an incoming train of code signals, magnetic means for controlling the times of necessary phase correction of said member, means including a self-restoring trigger circuit having two cross-coupled discharge devices for causing alternate action and inaction of said magnetic means, said trigger circuit having a stable state and an active state, and having the operational characteristics of a quick-acting, slow-release relay, circuit means responsive to pulses and dependent upon departures of said rotatable member from proper phase relation to said signals for tripping said trigger circuit from the stable state to the active state, thereby to operate said magnetic means, and a capacitor feeding pulses to said tripping circuit means, said capacitor being arranged to receive a charge at the start of mark and to dissipate said charge at the end of mark in said train of code signals.

3. The combination according to claim 2 and including a distributor having corrector segments and a brush rotatable with said rotatable member, said circuit means having connections for feeding pulses through said brush and corrector segments to said trigger circuit for tripping the same.

4. In a phase corrector for a cyclically operable unit in a multiplex telegraph system, a phase correcting circuit operable under coordinated control of a train of incoming code signals and a circuit interruptor which constitutes a part of said unit, said correcting circuit comprising a capacitor which is chargeable upon signal transition from space to mark and dischargeable upon signal transition from mark to space, a signal-controlled relay and resistive means connected to a direct current source for causing said capacitor to be alternately charged and discharged, an electronic trigger circuit having the operational characteristics of a quick-acting slow-release relay and having an input control circuit coupled through said circuit interrupter to one terminal of said capacitor, and means subject to control by said trigger circuit for effecting re-orientation of said cylindrically operable unit, thereby to restore its proper phase relation to said signals.

5. In a device according to claim 4 in which said trigger circuit includes a pair of discharge devices, a capacitor inter-coupling an input electrode of one discharge device and an output electrode of another discharge device in said trigger circuit, and a resistor interconnecting said input electrode and a cathode in said one device, said capacitor and resistor constituting a time constant circuit for fixing the release-period of said trigger circuit.

6. In a synchronizing system, a source of synchronizing impulses of one polarity, a normally conductive discharge tube having an input circuit subject to control by said impulses for biasing the tube to cut-off, a trigger circuit of the type having two cross-coupled discharge devices and having the operational characteristics of a quick-acting slow-release relay, a distributor comprising a brush continuously rotatable over a segmented ring, alternate segments of which are interconnected, a connection between said brush and said source of synchronizing impulses, another connection between said interconnected segments and the input circuit of said normally conductive tube, means for causing that tube when blocked by said impulses conducted through said segments to unblock a normally blocked one of the discharge devices of said trigger circuit, and means coupled to an output electrode in the other of said trigger circuit discharge devices for controlling a re-orientation device by which the phase relation of said distributor to said synchronizing impulses is maintained.

7. A system for maintaining a local device in synchronism with the periodic reception of incoming signal elements, comprising means for producing local pulses of one polarity in response to transitions from spacing to marking characteristics of said elements, a distributor comprising a brush continuously rotatable over a segmented ring, alternate segments of which are interconnected, a connection from said pulse producing means to said brush, a gating discharge tube having input and output circuits the input circuit being connected to said interconnected segments, means operable under control of said pulses when they are permitted to be conducted through said segments for blocking said gating tube, an electronic trigger circuit comprising cross-coupled discharge devices and time constant circuit components whereby quick triggering action and slow recovery to normal are obtained as operational characteristics of the trigger circuit, a connection from an output electrode of said gating tube to an input electrode of one device in said trigger circuit which is normally held non-conductive, and a utilization device coupled to an output electrode of the other device in said trigger circuit, said utilization device being operable to restore a proper phase relation between said brush and the arrival moments of said signal elements.

WARREN A. ANDERSON.

REFERENCES CITED

The following references are of record in the file of this patent:

UNITED STATES PATENTS

| Number | Name | Date |
| --- | --- | --- |
| 2,237,156 | Mathes | Apr. 1, 1941 |
| 2,270,449 | Kahn | Jan. 20, 1942 |